United States Patent [19]

Trevitt et al.

[11] Patent Number: 5,195,186
[45] Date of Patent: Mar. 16, 1993

[54] CONDITION CONNECTION FOR A PARALLEL COMPONENT PROCESSOR AND METHOD

[75] Inventors: Neil F. Trevitt, Kingston upon Thames; Malcolm E. Wilson, Dorset, both of England

[73] Assignee: Du Pont Pixel Systems Limited, England

[21] Appl. No.: 683,574

[22] Filed: Apr. 10, 1991

Related U.S. Application Data

[63] Continuation of Ser. No. 307,842, Feb. 8, 1989, abandoned.

[30] Foreign Application Priority Data

Mar. 23, 1988 [GB] United Kingdom ............... 8806835

[51] Int. Cl.[5] .............................................. G06F 15/16
[52] U.S. Cl. ..................................... 395/325; 395/725
[58] Field of Search .......... 364/200, DIG. 2, DIG. 1; 340/825.5; 395/325, 550, 725

[56] References Cited

U.S. PATENT DOCUMENTS

| | | | |
|---|---|---|---|
| 3,970,993 | 7/1976 | Finnila | 340/172.5 |
| 4,224,684 | 7/1980 | Conner | 364/900 |
| 4,270,170 | 5/1981 | Reddaway | 364/200 |
| 4,468,738 | 8/1984 | Hansen | 364/200 |
| 4,523,273 | 6/1985 | Adams | 364/200 |
| 4,653,110 | 3/1987 | Urushibata et al. | 382/41 |
| 4,667,192 | 5/1987 | Schmid | 340/825.5 |
| 4,710,769 | 12/1987 | Friedman | 840/825.03 |
| 4,745,544 | 5/1988 | Renner | 364/200 |
| 4,796,176 | 1/1989 | D'Amico | 364/200 |
| 4,908,749 | 3/1990 | Marshall | 364/200 |

FOREIGN PATENT DOCUMENTS 0114485 8/1984 European Pat. Off. .

OTHER PUBLICATIONS

Elderkin, Mark and Sweazey, Paul, "Future Bus Solves The Driving Problem," *New Electronics*, vol. 20, No. 16, Aug. 11, 1987, pp. 25-28.

Bruntlett, John E., "Serial Protocol For Distributed Microcontrollers," *On 8080 WESCON 86/Conference Record*, vol. 30, No. 3, Nov. 18-20, 1986, Log Angeles, Calif.

*Primary Examiner*—Roy N. Envall, Jr.
*Assistant Examiner*—A. Bodendorf
*Attorney, Agent, or Firm*—Sterne, Kessler, Goldstein & Fox

[57] ABSTRACT

A system and method by which individual processors in a parallel component processor can flexibly communicate a variety of global conditions via a single open collector status line is disclosed.

6 Claims, 6 Drawing Sheets

| STATUS CONFIGURATION | Output Enable 220 | | | Output Invert 216 | | | Global/Local 214 (High = global, Low = local) | | | Input Invert 206 | | |
|---|---|---|---|---|---|---|---|---|---|---|---|---|
| | 402 | 404 | 406 | 402 | 404 | 406 | 402 | 404 | 406 | 402 | 404 | 406 |
| Logical "OR" of Processors 402, 404 and 406 | High | High | High | High | High | High | High | High | High | High | High | High |
| Logical "NAND" of Processors 402, 404 and 406 | High | High | High | Low | Low | Low | High | High | High | High | High | High |
| Logical "NOR" of Processors 402, 404 and 406 | High | High | High | High | High | High | High | High | High | Low | Low | Low |
| Logical "AND" of Processors 402, 404 and 406 | High | High | High | Low | Low | Low | High | High | High | Low | Low | Low |
| Logical "OR" of only 402 and 404, 406 reads global. | High | High | Low | High | High | Dont Care | Low | Low | High | Dont Care | Dont Care | High |
| Logical "OR" of only 402 and 404, 406 reads local status | High | High | Low | High | High | Dont Care | High | High | Low | High | High | Dont Care |
| Only 402 broadcasts status. 402, 404, 406 read Global. | High | Low | Low | Dont Care | Dont Care | Dont Care | High | High | High | Low | Low | Low |
| Logical "AND" of 402, 404 and 406. 402 uses global 404, 406 local | High | High | High | Low | Low | Low | High | Low | Low | Low | Dont Care | Dont Care |
| GRAPHICS PROCESSOR | 402 | 404 | 406 | 402 | 404 | 406 | 402 | 404 | 406 | 402 | 404 | 406 |

FIG. 5

CONDITION CONNECTION FOR A PARALLEL COMPONENT PROCESSOR AND METHOD

This application is a continuation of application Ser. No. 07/307,842, filed Feb. 8, 1989 now abandoned.

I. BACKGROUND OF THE INVENTION a. Field of the Invention

This invention relates to computerized imaging and graphics systems and methods.

b. Related Art

In most imaging and graphics computer systems an image displayed on a video screen is defined by a group of points called pixels. In monochrome line and character displays, for example, each pixel is typically defined by one bit of information which is used to determine whether the pixel is on or off.

In most present day imaging and graphics systems, the pixels are defined by a number of bits which are used to define colors. In many conventional systems, the number of bits used to define each pixel is either four or eight. Four bits will allow sixteen colors to be defined on the video screen, while eight bits will allow 256 colors to be defined.

Some imaging and graphics systems use multiple processors in parallel to increase the number of colors which may be displayed. For example, it may be desired to use a large grey scale along with a spectrum of 256 colors. Also, it may be desirable to define extra bits for use as a graphic or textual overlay. Additional bits may also be desirable for use by various processing hardware. Typically 24 bits are required to display realistic color images, 8 bits for each of the color components red, green and blue. Sophisticated real color systems can also require an extra 8 bits per pixel, used for storing masking and overlay information, giving 32 bits per pixel in total.

A 24 bit system is a typical example of a graphics processing system which is configured to utilize two or more graphics processors in parallel to increase performance. It is common to use complete graphics processors to process each 8 bit component of the 24 bit image. Such a configuration of processors is sometimes referred to as a parallel component processor.

In such a system it is sometimes required that conditions on one or more of the component processors affect the operations occurring in the other processors. A typical example would be a situation where it is desired to check for a specific color across all three processors. Where the specific color is present in the processors frame store (i.e. image memory), the processor posts a logical "1" on its status line. Where the specific color is not present, the processor posts a logical "0". The status bits from the three processors are conventionally placed on a single open collector line of an interprocessor bus and formed into a global interprocessor status.

Those skilled in the art will recognize that open collector schemes will naturally form a logical "AND" of all signals place on a given status line. In other words, if any processor's status bit is low, the interprocessor status line will be forced low. Otherwise, the status line will default to its normally high state.

In the above example, all three processors would monitor the status line and test whether it is high. If all three processors have the same color in a tested memory location, the interprocessor status line will be high. Otherwise it will be low. In this manner, all three processors can know when a given parallel task is complete.

While it is important to be able to know when each internal status bit has gone high, or that one has gone low. Conventional open collector systems limit themselves to being able to detect only those two state of events. For example, graphics processors using conventional open collector technology cannot use a single status line to tell if all of the processors on the bus are posting a low status, or just one. As has been stated, any one processor posting a low on the line will hold the line low.

II. SUMMARY OF THE INVENTION

The present invention provides a system and method by which individual processors in a parallel component processor can flexibly communicate a variety of global conditions via a single interprocessor status line.

The inventors have discovered that in addition to being able to detect "all high" or "at least one low" conditions, it is advantageous to be able to use the same single open collector status line detect conditions such as "all low" (e.g. to detect that no processors have detected a given condition), "at least one high" (e.g. to detect that a first or subset of processors has detected a given condition), "at least one, but not all low" (e.g. to detect that a first processor has been reset).

The inventors have further discovered that it is advantageous to be able to form the interprocessor status on a given single line from a variety selected subset of processors.

In addition, the inventors have discovered that it is advantageous to be able to have selected processors use their own internal status whilst still being able to modify the global status.

In the preferred embodiment, the system and method of the present invention utilize an open collector line which all of the processors can drive and receive for use locally. A number of enhancements are advantageously included by the present invention that greatly extend the usefulness of this line. The enhancements include the definition of several mode bits (i.e. data bits which can be output from the graphics processor), and the addition of support circuitry that uses these bits to perform Boolean operations on the incoming and outgoing status signals.

In the preferred embodiment of the present invention, the specific enhancements include:

Inhibit logic and an associated inhibit mode bit that prevents that processor from driving the shared status line. This aspect of the present invention allows the status line to be formed by a subset of processors. If desired, the resulting status can be used by all of the processors.

Local/global select logic and an associated mode bit of the present invention cause the processor to read its internally produced status line instead of the interprocessor status line. The addition of this mode bit by the present invention allows the processor to modify the globally available status while using its own to make processing decisions. It also allows any combination of processors to use their locally produced status line independent from the global line.

Output invert logic and an associated output invert mode bit of the present invention enables each processor to elect to invert the status line before it is passed on to the open collector line.

Input invert logic and an associated mode bit of the present invention allows each processor to elect to invert the status from the open collector line as it is received, and before it is used locally.

An open collector line naturally produces a logical "AND" of all its contributing lines. Advantageously, designing the graphics processor in accordance with the present invention to be able to perform input and output inversions allows the logic function to be converted to a "NAND", "OR" or "NOR" by virtue of the modified Boolean logic. In addition, the inhibit bit of the present invention enables graphics processors to perform polling sequences which were heretofore impossible or impracticable using single, conventional open collector status schemes.

By utilizing the present system, large (extraordinary) amounts of status information can be passed along on a single interprocessor line. For example, the present system enables the microcode to use one status line to determine whether a particular processor has detected a given condition, or to determine which processors have detected a condition and which have not.

The present system also enables each processor to react to the interprocessor status signal in an independent fashion. For example, one processor can monitor its own status, while still posting that status for the interprocessor status line. Another processor can be looking for an "OR" of all three status bits. A third processor's microcode can look for and react to a NOR condition.

III. BRIEF DESCRIPTION OF THE DRAWINGS

The present invention is better understood by reference to the following drawings:

FIG. 5 is a chart showing some examples of status configurations according to the present system and method.

IV. DETAILED DESCRIPTION OF THE PREFERRED EMBODIMENTS

The present invention provides a system and method by which individual processors in a parallel component processor can communicate via a condition status line.

In the preferred embodiment of the present invention, the status line is an open collector line which all of the processors can drive and receive. A number of enhancements can advantageously be included in accordance with the present invention that greatly extend the usefulness of this line.

These aspects of the present invention include: inhibit logic which allows any processor to disconnect its status from the interprocessor status line, whereby the global status can be formed from a subset of processors; input invert logic, which enables incoming status to be inverted before being used by a given processor; output invert logic, which enables any processor's outgoing status to be inverted before being put onto the single global status line; and a local/global select logic, which enables a processor to use its own locally produced status whilst still having the capability to drive the global status line.

Figure 1:
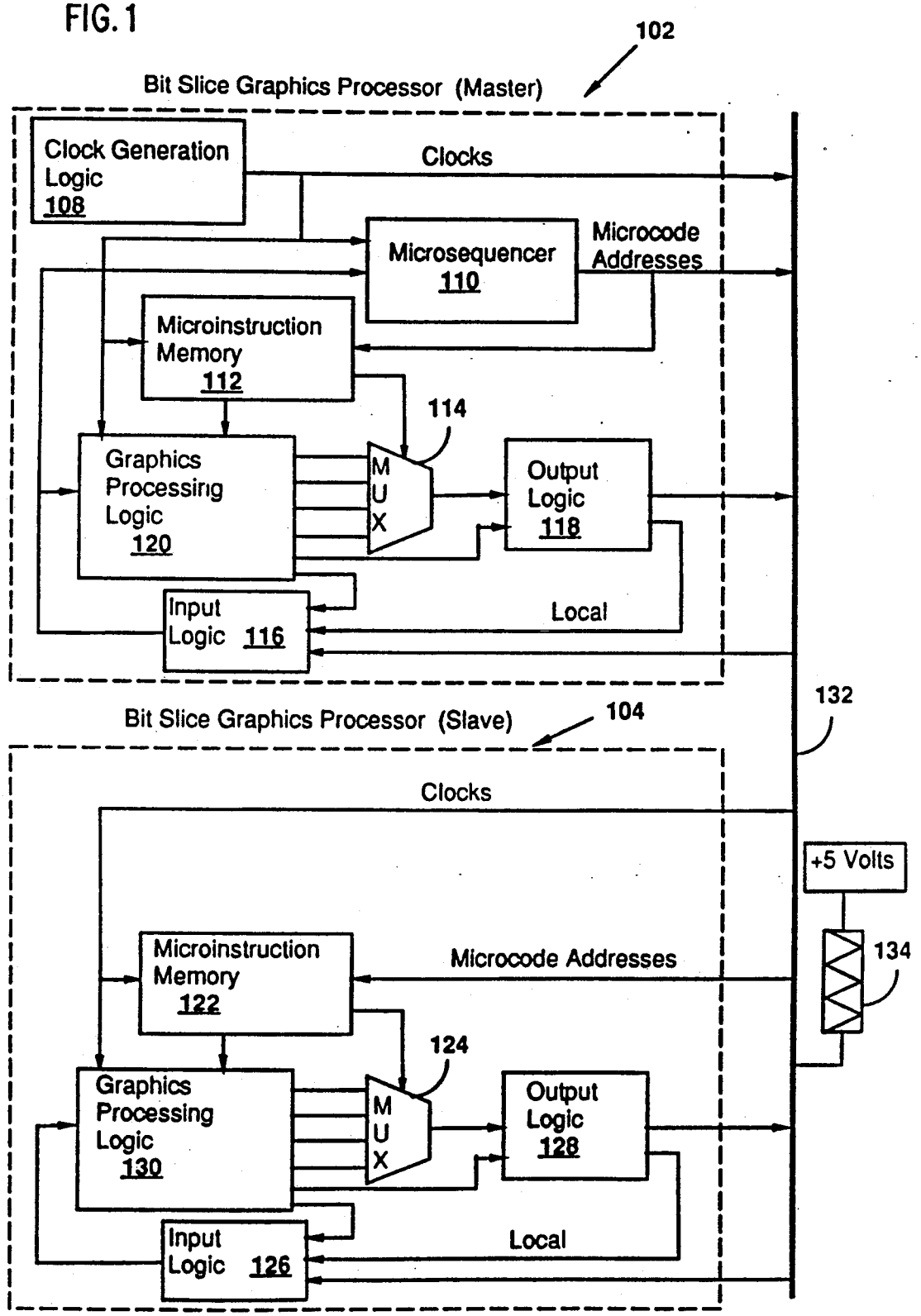
FIG. 1 is a general block diagram of a multiple graphics processor system using the present system and method.

FIG. 1 is a block diagram of a parallel component processor system using two graphics processors. This diagram will be used to illustrate how status is communicated according to the system and method of the present system.

Bit slice graphics processors are known by those skilled in the art. The graphics processors 102,104 are essentially bit slice graphics processors which include input and output logic according to the present system. The preferred graphics processor is a Du Pont Pixel Systems GIP, available from Du Pont Pixel Systems Limited (formerly known as benchMark Technologies Limited), 5 Penrhyn Road, Kingston-upon-Thames, Surrey KT1 2BT, England. However, it should be understood that any suitable graphics processor can be used by the present invention.

As can be best seen from FIG. 1, the system and method of the present invention includes two bit-slice graphics processors 102,104. The first graphic processor 102 is configured as a master. The second graphics processor 104 is configured as a slave.

For the purposes of this specification, a graphics processor is defined as a master if it generates processor clocks and microaddresses for itself and for all graphics processor slaves on the interprocessor bus 132. A graphics processor is defined as a slave if it is driven by microaddresses and clocks provided by a graphics processor master over the interprocessor bus.

This organization means that all the component processors are operating in synchronism, always executing the same microinstruction. The different processors can, however, be performing different actions in one particular microinstruction. This is readily understood when it is realized that each processor is controlled by a different portion of the total microword (i.e. each microinstruction).

The master graphics processor 102 includes, for example, a clock generation logic 108, a microsequencer 110, a microinstruction memory 112, a status multiplexer 114, an input logic 116, an output logic 118, and a graphics processing logic 120. The slave graphics processor 104, includes its own microinstruction memory 122, a status multiplexer 124, an input logic 126, an a output logic 128 and graphics processing logic 130. Each of these circuits (subsystems) can be constructed identically to its counterpart in the graphics processing master.

It will be observed that the slave graphics processor 104 does not include an active microsequencer, nor does it include active clock generation logic. Instead, it uses the addresses and clocks put on to the interprocessor bus 132 by the master graphics processor 102.

In the preferred embodiment, a microsequencer and clock generation logic are physically present on the slave graphics processor but are jumpered out of the circuit so as to produce a slave configuration (as shown for slave graphics processor 104). The slave processor 104 can use a status line, even though it does not possess a microsequencer, and therefore cannot perform independent jumps.

This is because the graphics processors 102, 104 have a number of operations that can be performed conditionally depending on the status line. These include writing to the frame memory, counting the frame memory address generators, and writing to the ALU (within the graphics processing logic 130). Many algorithms can be sped up by using these conditional operations.

The status lines within the interprocessor bus 132 are of an open collector type each with a pull up resistor 134. Open collector bus schemes are well known by those skilled in the art. Each graphics processor's output logic 118,128 includes an open collector driver. In conventional graphics processors, the output logic essentially consists of an open collector driver. The interprocessor bus should include at least as many open collector status lines as there are interprocessor status bits.

In the presently preferred embodiment of the present invention, only one interprocessor status bit is used.

The interprocessor bus 132 will also preferably include other lines, (aside from just the open collector status lines). These include processor data lines, processor microaddress lines, microcode memory control lines, processor clock lines, and processor interrupt lines.

The status multiplexers 114, 124 of the present invention multiplex interprocessor status bits from the graphics processing logic 120, 130 so that status information can be passed between processors on a single status line. In the presently preferred embodiment, there are 32 status bits and the status multiplexers 114,124 are 32:1 single bit multiplexers.

It should be understood that many alternative embodiments can be used and may even be preferable depending on the application. For example, some graphics processors may pass many status bits in parallel by using more than one interprocessor status line. In this case, the status multiplexers 114,124 could be eliminated or the status could be organized into groups with a different status multiplexer used for each group. It should be understood that any logic using multiple status lines for an input will typically have a multiplexer to select a condition line for use. The number of interprocessor status lines and the number of interprocessor status bits passed in parallel will likely vary from graphics processor to graphics processor. In any event, the present system will be equally (or possibly more) useful where parallel interprocessor status bits are to be passed.

Figure 2:
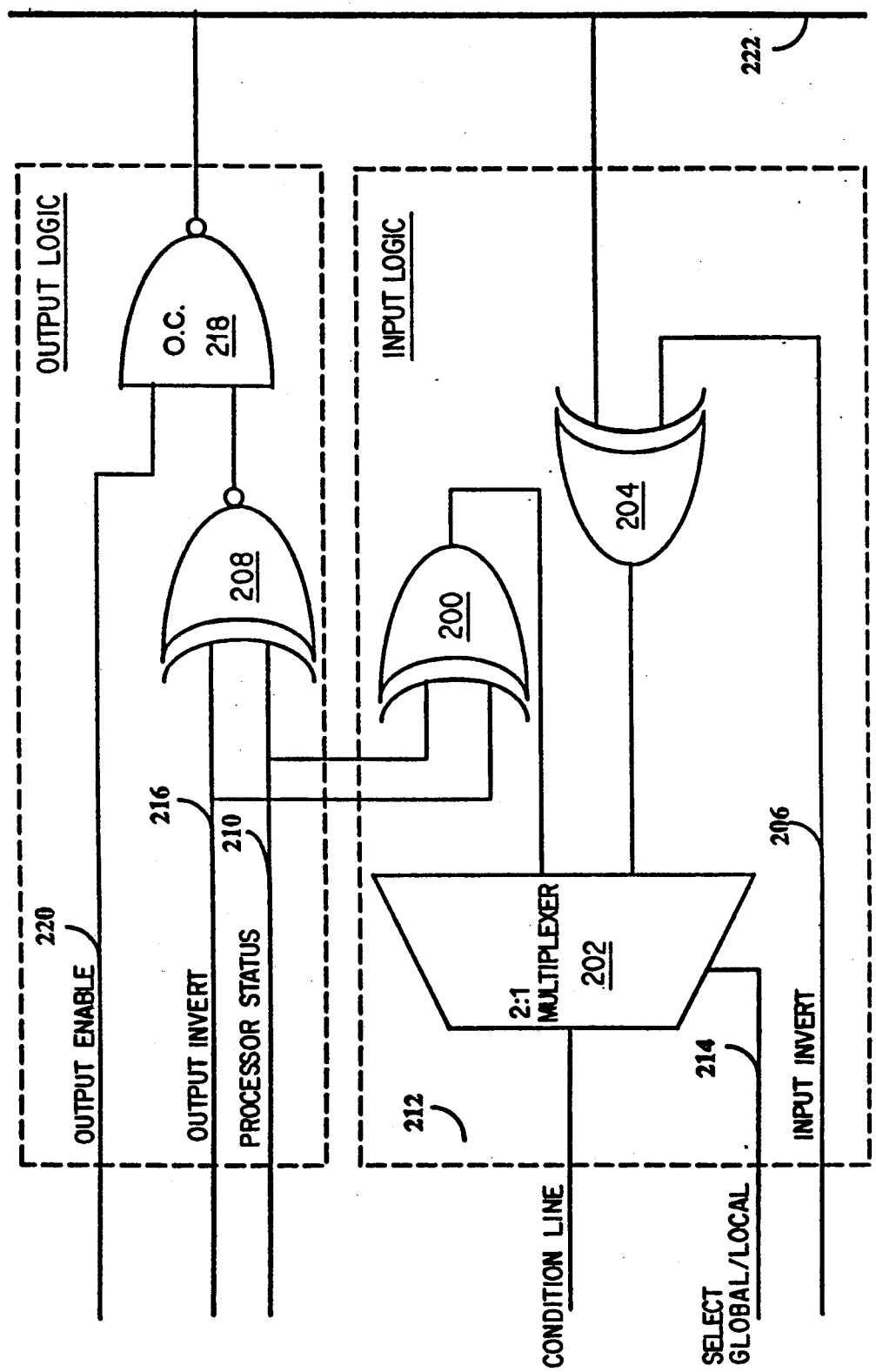
FIG. 2 is a schematic representation of the status logic of the present invention.

FIG. 2 is a schematic representation of output and input logic according to the system and method of the present invention. The input logic includes, a one bit, 2:1 multiplexer 202, a first "Exclusive OR" gate 200, and a second "Exclusive OR" gate 204. An input invert line 206, from the graphics processor to be utilized, is connected to one input of the second "Exclusive OR" gate 204. The other input of the second "Exclusive OR gate" 204 is connected to an open collector global status line 222. The input invert line 206, is used to carry the invert mode bit from the graphics processor. One input of the 2:1 multiplexer is connected to the output of the "Exclusive OR" gate 204. The second input of the multiplexer 202 is connected to the output of the first "Exclusive OR" gate 200. One input of the first "Exclusive OR" gate 200 is connected to an output invert control line 216 from the graphics processor, while the other input of the first "Exclusive OR" gate 200 is connected to the graphics processor's, processor status line 210. The second multiplexer input will receive the internal processor status in either inverted or non inverted form depending on whether the output invert mode bit (on line 216) is set. The output of the multiplexer 202 is tied to the condition status line 212.

This configuration of the present invention enables a graphics processor containing this logic to receive a selection of; its internal processor status, its inverted internal processor status, the global status, or the inverted global status.

A block diagram of the output logic 128 is also shown in FIG. 2. The output logic includes an open collector driver 218 and "Exclusive NOR" logic 208. The open collector driver 210 has its output connected to the single global status line 222. One input of the open collector driver is connected to the output enable line 220 from the graphics processor. The other input of the open collector driver 218 is connected to the output of "Exclusive NOR" logic 208. One input of the "Exclusive NOR" logic is the output invert line 216 from the graphics processor, while the other input is the processor status line 210.

From FIG. 2 it will be observed that the current embodiment of the present invention uses an inverting open collector gate (a NAND 218). This inversion is taken into account by the output and input inversion logic. In the output logic, the "Exclusive NOR" logic 208 inverts the processor status signal before it gets to the open collector NAND gate 218. This compensates for the NAND gate inversion. Advantageously, the "Exclusive NOR" logic allows the status placed on the open collector global status line 222 by the graphics processor to be inverted when the output invert line 216 goes high and to be non inverted when the output invert line is low.

On the input logic side, if a processor elects to use an internal status line, then there is no inversion through the open collector gate. The first "Exclusive OR" gate 200 handles this by ensuring that the wrapped around status is only inverted once in response to an output invert signal (on the output invert line 216).

Figure 3:
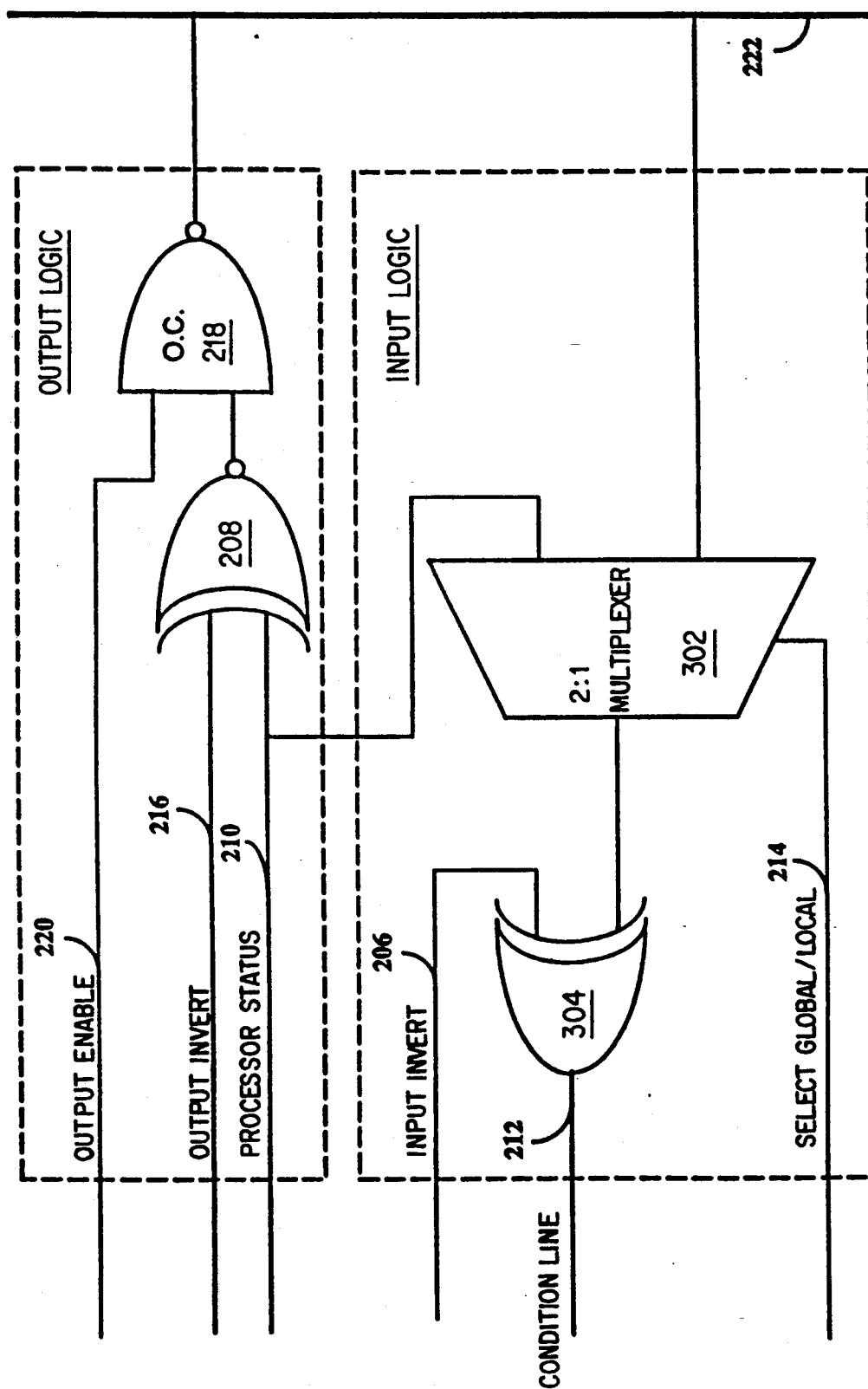
FIG. 3 is a schematic representation of an alternate embodiment of the status logic of the present invention.

It should be noted that an alternative configuration of this aspect of the present invention is possible. This embodiment is shown in FIG. 3.

One input of the multiplexer 302 could be tied directly to the global status line 222 and the other input of the multiplexer 302 could be tied directly to the internal processor status line 210. The output of the multiplexer 302 could be tied to one input of an "Exclusive OR" gate 304 and the input invert line 206 could be tied to the other input of the "Exclusive OR" gate 304. The output of the "Exclusive OR" gate 304 could then be tied to the condition line.

This configuration of the present invention enables similar operation to the configuration above except that the graphics processor using this alternative embodiment will be able to receive inverted or non inverted internal or global status independent of whether it is outputting inverted or non inverted status. Further this configuration allows for the elimination of the first "Exclusive OR" gate 200.

The embodiment of FIG. 2 was actually tested in the present system environment and will therefore be used as a reference. The inventors contemplate, however, that either embodiment may be used successfully and that the embodiment of FIG. 3 may eventually be determined to be preferable.

The operation of the input logic will now be explained with reference to the FIG. 2 embodiment. The input logic 118, 128 can either pass through, invert, or bypass the status on the interprocessor status line. In order to "pass through" the status to the graphics processor, the graphics processor sets its input invert bit to a logical zero, and its select global/local bit (on line 214) so as to have the multiplexer 202 select the global status signal from the single global status line 222.

In order to "invert" the incoming status, the procedure of the present invention described above is followed, except that the invert bit is set to a logical one. In order to bypass the global interprocessor status, the graphics processor sets its global/local mode bit so as to cause the multiplexer 202 to select the internal processor status signal from line 210. This will cause the graphics processor to only see its internal status and to ignore the interprocessor status. The internal status bit may also be inverted as it is wrapped around through by setting the output invert mode line 216 to a high state.

From FIG. 2 it can be seen that any graphics processor can exclude its status from the single interprocessor status line by setting its output enable mode bit to a logical zero. This aspect of the present invention will force the output of the open collector driver high on the open collector global status line 222. The graphics processor can also invert its outgoing processor status bit by setting its output invert mode bit to a logical "1".

The output logic of the present invention will also be explained by reference to FIG. 2.

When the output enable mode bit (on the output line 220) is set low, the output of the open collector "NAND" gate 218 is forced to output a constant high signal. Since the open collector global status line 222 forms a logical "AND" of the signals appearing on it, all high (logical one) signals will not affect the status (i.e. any low signal will pull the global status line 222 low). In this manner, when the output enable mode bit is set low, the processor's status is logically invisible to the global status line 222.

When the output enable mode bit is set high, the output of the open collector "NAND" gate will toggle inverted to the output of the "Exclusive NOR" logic 208. Setting the output invert mode bit high will force the "Exclusive NOR" logic to leave the processor status uninverted at its output. the processor status signal passes through the open collector "NAND" gate 218 it will be inverted.

When the Output invert line is held low, the "Exclusive OR" logic 208 will invert the processor status signal. When the signal passes through the open collector "NAND" gate 218, it will be inverted again resulting in an uninverted processor status signal being put onto the global status line 222.

Figure 6:
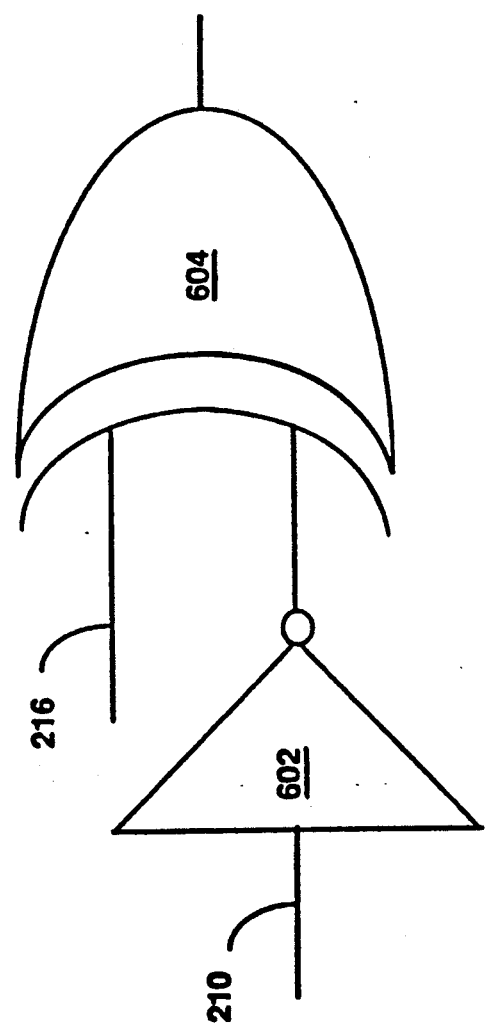
FIG. 6 is a block diagram of the preferred embodiment of the "Exclusive NOR" logic utilized with the present invention.

The "Exclusive NOR" logic 208 may be better understood by reference to FIG. 6. The "Exclusive NOR" logic is formed by placing an inverter 602 at the processor status input of an "Exclusive OR" gate 604.

From FIG. 2 it can be understood that by properly programming the mode bits of the present invention, logical "AND", "OR", "NAND" and "NOR" functions can be performed on an interprocessor status signal. Each processor having the ability to invert what it sees, invert what it puts out, use its own status, and/or take its status bit off of the status line completely. In addition, any number of processors can see an inverted status signal while the others look at a non-inverted signal.

These abilities allow functions to be performed by the present invention on a single status line that are not possible using conventional open collector schemes. For example, by only allowing one processor to put its status on the signal line at one time, the processors can perform a poll to find out who has raised or has not yet raised a given status signal. For another example, by "ORing" the status bits on the interprocessor line, the line can be monitored to determine when the first status is posted.

Figure 4:
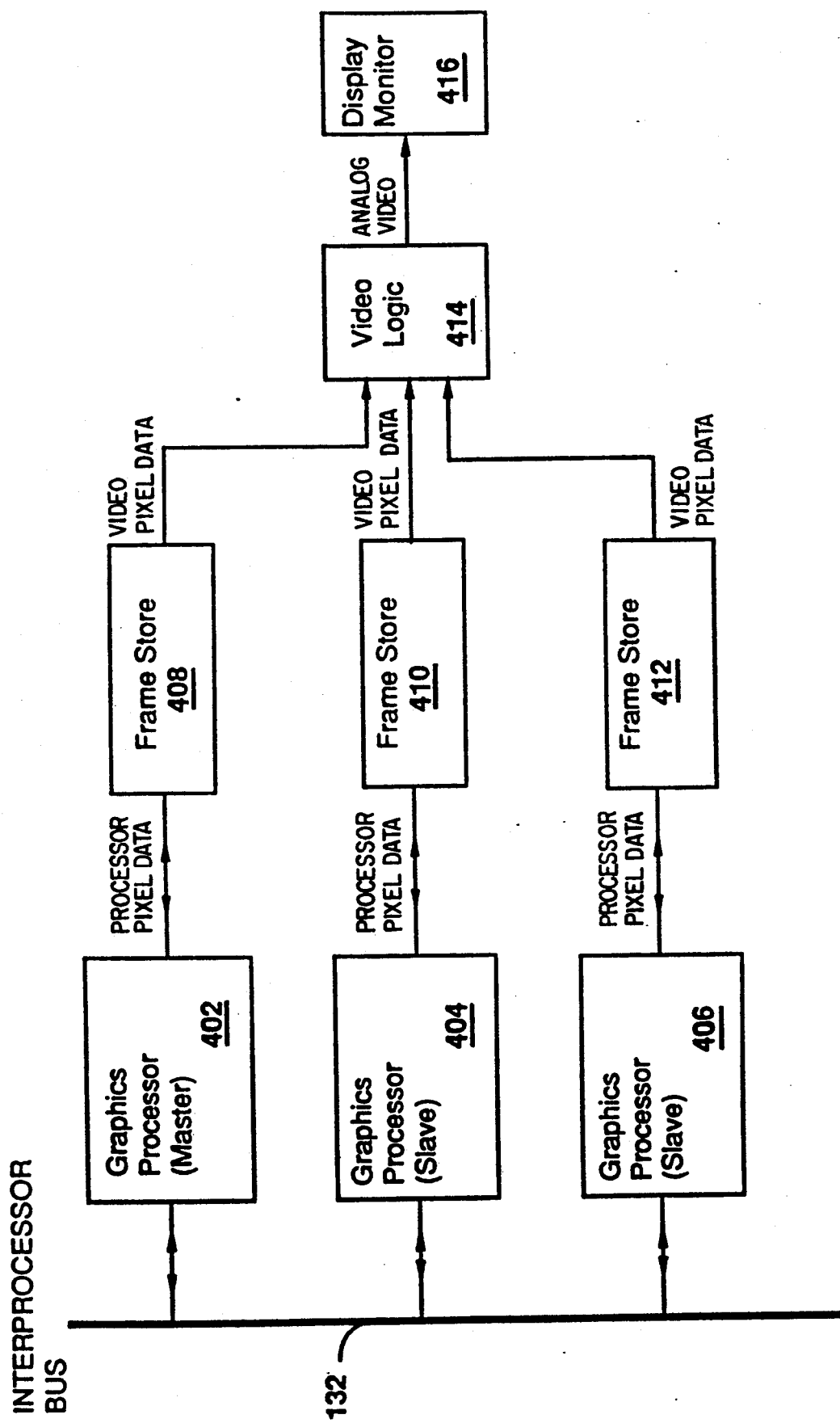
FIG. 4 is a block diagram of a parallel component processor utilizing three graphics processors on an interprocessor bus.

Some examples of the possible operations of the present invention will be explained by reference to FIGS. 2, 4 and 5. FIG. 4 shows a 24 bit color system having three parallel component processors 402, 404, 406. In this system, each graphics processor has its own frame store (in this case a screen refresh memory) 408, 410, 412 in which to store its eight bit pixel data for display. All three frame stores have their video output information processed for display by the video output logic 414 so as to produce a 24 bit color image on the display monitor 416.

A preferred embodiment of the framestore 408, 410, 412 is a Du Pont Pixel Systems bFs framestore. The video logic 414 is preferably a Du Pont Pixel Systems MUVOM (1 per each Frame Store). The Du Pont Pixel Systems bFs framestores and MUVOMs are available from Du Pont Pixel Systems Limited, 5 Penrhyn Road, Kingston-upon-Thames, Surrey KT1 2BT, England. The display monitor 416 is a conventional high resolution bit mapped display monitor of conventional design.

FIG. 5 shows some of the possible status configurations attainable in the FIG. 2 and FIG. 3 embodiments of the system and method of the present invention. It should be understood that these are just some of the examples possible using three processors, and that the number of combinations will increase with the number of processors sharing the status line in accordance with the present invention.

From the foregoing description, it can be seen that the present system enables operations not previously possible with graphics using conventional single open collector line status schemes. For example, assume a system is designed with four graphics processors, (1 master, 3 slaves), sharing a single open collector status line. Further assume that three of the graphics processors are used for 8 bits each of color generation, and that the fourth graphics processor is used to provide a graphic overlay. If one desires to check for a particular color in the memory of the three color graphics processors and not check in the memory of the overlay graphics processor, the overlay processor can be excluded from the status by disabling its output using its output enable line 220.

The example of the present invention can be made even more complex. Assume that one bit plane of the fourth graphics processors pixel data used to generate a bit mask, and that it is now desired to have this processor let the other processors know that a masked area of the screen memory has been addressed. Its status output can be enabled while the other graphics processor status outputs are disabled. The other graphics processor still, however, can read and use the global status line.

The first and second examples can occur one after the other, using only one status line. The matter may be further complicated. Assume that after all of the previous operations are complete, it is desired to test for whether any one of the graphics processors encountered an error. In this case, the graphics processors will "OR" their status bits on the global status line 132. Similarly, if an error condition is encountered the processor which produced the error status can be identified through a polling sequence, by output enabling only one graphics processor at a time or selective combinations of the processors while enabling all of the processors to read the global status.

A polling sequence can also be accomplished by varying the Boolean equations used to form the Global Status signal and using a map of the results to determine which processor has raised or lowered its status bit.

For yet another example of the present invention, assume that it is desired to use two of the processors to generate a mask and it is desired to let all of the processors know at what point the masks intersect. In that case the status can be formed from an AND of only the two mask producing processors. Further assume that some of the processors do not care where the masks intersect but are only interested in internal status. In that case, some processors can read the global status line while others read their own internal status.

In reading all of these examples of the present invention, it should be remembered that because of the internal status multiplexers 114, 124, status bits with different meanings can be put on to the single line at different times. Therefore, any number of different status combinations, for any number of purposes can be performed in sequence on the same single status line.

Some other uses of the present invention include:

Cases where all of the graphics processors are performing conditional writes dependent on testing their own frame memory data (e.g. all component data below value 100 can be set to zero).

Color correction operations: In four processor 24 bit color systems the blue graphics processor can be sending status to the red and green graphics processor, the status enabling some operation on the red and green components. Simultaneously a fourth graphics processor can be performing operations on mask data, conditional on the mask data itself.

V. CONCLUSION

Many modifications of the system and method of the present invention will now occur to those skilled in the art. From the foregoing description, it can be understood that the number of uses for the present system and method are virtually uncountable.

For example, any number of processors can share the single global status line. Also, more than one global status line can be used and the present system and method can be used with each status line. The input and output logic could also be designed using a PAL, Gate Array, optical logic or other integrated circuit.

Therefore while the preferred embodiments of the present invention have been described they should not be considered to be a limitation but only as exemplary thereof.

We claim:

1. A system for passing status information between multiple graphics processors comprising:
   (A) a global status line;
   (B) a master graphics processor comprising:
      (i) first processing circuitry for generating a first internal processor status signal, a first input invert signal, a first output invert signal, a first output enable signal, and a first global/local select signal;
      (ii) a clock generator circuit connected to said first processing circuitry for generating a system clock signal and for transmitting said system clock signal to said first processing circuitry;
      (iii) first output logic means connected to said first processing circuitry and to said global status line for performing Boolean operations on the first internal processor status signal to produce a first external processor status signal and for making said first external processor status signal available on the global status line; and
      (iv) first input logic means connected to said first processing circuitry and to said global status line for receiving a global status signal from the global status line, for receiving said first internal processor status signal and said first global/local select signal from said first processing circuitry, and for transmitting one of said global status signal and said internal processor status signal to said first processing circuitry in response to the first global/local select signal; and
   (C) a slave graphics processor comprising,
      (i) second processing circuitry for generating a second internal processor status signal, a second input invert signal, a second output invert signal, a second output enable signal, and a second global/local select signal;
      (ii) synchronization logic connected to said second processing circuitry for receiving said system clock signal and for synchronizing operation of said second processing circuitry with operation of said first processing circuitry;
      (iii) second output logic means connected to said second processing circuitry and to said global status line for performing Boolean operations on the second internal processor status signal to produce a second external processor status signal and for making said second processor status signal available on the global status line; and
      (iv) second input logic means connected to said second processing circuitry and to said global status line for receiving a global status signal from the global status line, for receiving said second internal processor status signal and said global/local select signal from said second processing circuitry, and for transmitting one of said global status signal and said second internal processor status signal to said second processing circuitry in response to the second global/local select signal.

2. The system of claim 1 wherein:
   (A) the first output logic means comprises,
      (i) an "Exclusive NOR" logic having a status input for receiving the first internal processor status signal, an output invert input for receiving the first output invert signal, and an output for outputting the result of an "Exclusive NOR" of the first internal processor status signal and the first output invert signal;
      (ii) a first open collector interface having a first input logically connected to the output of the "Exclusive NOR" logic, a second input for receiving the first output enable signal, and an open collector output for outputting the result of a "NAND" of the output of the first "Exclusive NOR" logic and the first output enable signal;
   (B) the first input logic means comprises,
      (i) a first two-to-one multiplexer having a first input logically connected to the first internal processor status signal, a second input for receiving the global status signal, a multiplexer output, and a select input for receiving the first global/local select signal, the select input being operable to cause any one of the first internal processor status signal and the global status signal to appear at the multiplexer output of the first two-to-one multiplexer; and (ii) a first exclusive "OR" gate having a first input logically connected to the multiplexer output of the first two-to-one multiplexer, a second input for receiving the first input invert signal, and an output for providing the result of an "Exclusive OR" of a signal on the multiplexer output of the first two-to-one multiplexer and the first input invert signal;

(C) the second output logic means comprises, (i) second "Exclusive NOR" logic having a status input for receiving the second internal processor status signal, an output invert input for receiving the second output invert signal, and an output, for outputting the result of an "Exclusive NOR" of the second internal processor status signal and the second output invert signal; and (ii) a second open collector interface having a first input logically connected to the output of the second "Exclusive NOR" logic, a second input for receiving the second output enable signal, and an open collector output for outputting the result of a "NAND" of the output of the second "Exclusive NOR" logic and the second output enable signal; and (D) the second input logic means comprises, (i) a second two-to-one multiplexer having a first input logically connected to the second internal processor status signal, a second input for receiving the global status signal, a multiplexer output, and a select input for receiving the second global/local select signal, the select input being operable to cause any one of the second internal processor status signal and the global status signal to appear at the multiplexer output of the second two-to-one multiplexer; and (ii) a second exclusive "OR" gate having a multiplexer input logically connected to the multiplexer output of the second two-to-one multiplexer, an input invert input for receiving the second input invert signal, and an output for providing the result of an "Exclusive OR" of a signal on the multiplexer output of the second two-to-one multiplexer and the second input invert signal.

3. The system of claim 1 wherein:

(A) the first output logic means comprises, (i) a first "Exclusive NOR" logic having a status input for receiving the first internal processor status signal, an output invert input for receiving the first output invert signal, and an output for outputting the result of an "Exclusive NOR" of the first internal processor status signal and the first output invert signal; and (ii) a first open collector interface having a first input logically connected to the output of the first "Exclusive NOR" logic, a second input for receiving the first output enable signal, and an open collector output for outputting the result of a "NAND" of the output of the first "Exclusive NOR" logic and the first output enable signal;

(B) the first input logic means comprises, (i) a first "Exclusive OR" gate having a first input logically connected to the first output invert signal, a second input for receiving the first internal processor status signal, and an output for providing a selectively inverted first internal processor status signal;

(ii) a second "Exclusive OR" gate having a first input for receiving the global status signal, a second input for receiving the first input invert signal and an output for providing a first selectively inverted global status signal; and (iii) a first two-to-one multiplexer having a first input logically connected to receive the selectively inverted first internal processor status signal, a second input logically connected to receive the first selectively inverted global status signal, a multiplexer output, and a select input for receiving the first global/local select signal, the select input being operable to cause any one of the selectively inverted first internal processor status signal and the first selectively inverted global status signal to appear at the multiplexer output of the first two-to-one multiplexer;

(C) the second output logic means comprises, (i) a second "Exclusive NOR" logic, having a status input for receiving the second internal processor status signal, an output invert input for receiving the second output invert signal, and an output, for outputting the result of an "Exclusive NOR" of the second internal processor status signal and the second output invert signal;

(ii) a second open collector interface having a first input logically connected to the output of the second "Exclusive NOR" logic, a second input for receiving the second output enable signal, and an open collector output for outputting the result of a "NAND" of the output of the second "Exclusive NOR" logic and the second output enable signal; and (D) the second input logic means comprises, (i) a third "Exclusive OR" gate having a first input logically connected to the second output invert signal, a second input for receiving the second internal processor status signal, and an output for providing a selectively inverted second internal processor status signal;

(ii) a fourth "Exclusive OR" gate having a first input for receiving global status signal, a second input for receiving the second input invert signal and an output for providing a second selectively inverted global status signal; and (iii) a second two-to-one multiplexer having a first input logically connected to receive the selectively inverted second internal processor status signal, a second input logically connected to receive the second selectively inverted global status signal, a multiplexer output, and a select input for receiving the second global/local select signal, the select input being operable to cause any one of the selectively inverted second internal processor status signal and the second selectively inverted global status signal to appear at the multiplexer output of the second two-to-one multiplexer.

4. A method for passing status information between a first graphics processor and a second graphics processor over an interprocessor status line, the first graphics processor producing a first processor status signal, the second graphics processor producing a second processor status signal, the interprocessor status line performing a logical "AND" of all signals connected to it to produce a global status signal, the method comprising the steps of:
(a) providing the first processor status signal to the interprocessor status line;
(b) providing the second processor status signal to the interprocessor status line;
(c) receiving the global status signal from the interprocessor status line into the first graphics processor; and
(d) selectively inverting the global status signal in hardware in the first graphics processor to produce a logical "NAND" of the first and second processor status signals.

5. A method for passing status information between a first graphics processor and a second graphics processor over an interprocessor status line, the first graphics processor producing a first processor status signal, the second graphics processor producing a second processor status signal, the interprocessor status line performing a logical "AND" of all signals connected to it to produce a global status signal, the method comprising the steps of:

(a) selectively inverting the first processor status signal in hardware within the first graphics processor to produce an inverted first processor status signal;
(b) providing the inverted first processor status signal to the interprocessor status line;
(c) selectively inverting the second processor status signal in hardware within the second graphics processor to produce an inverted second processor status signal;
(d) providing the inverted second processor status signal to the interprocessor status line; and
(e) receiving the global status signal from the interprocessor status line into the first graphics processor to produce a logical "NOR" of the first and second processor status signals.

6. The method of claim 5, further comprising the step of:
(f) selectively inverting the global status signal in hardware on the first graphics processor to produce a logical "OR" of the first and second processor status signals.

* * * * *